March 19, 1968     R. H. DONLON ET AL     3,374,005
INDEPENDENT WHEEL SUSPENSION
Filed Aug. 26, 1965     3 Sheets-Sheet 1
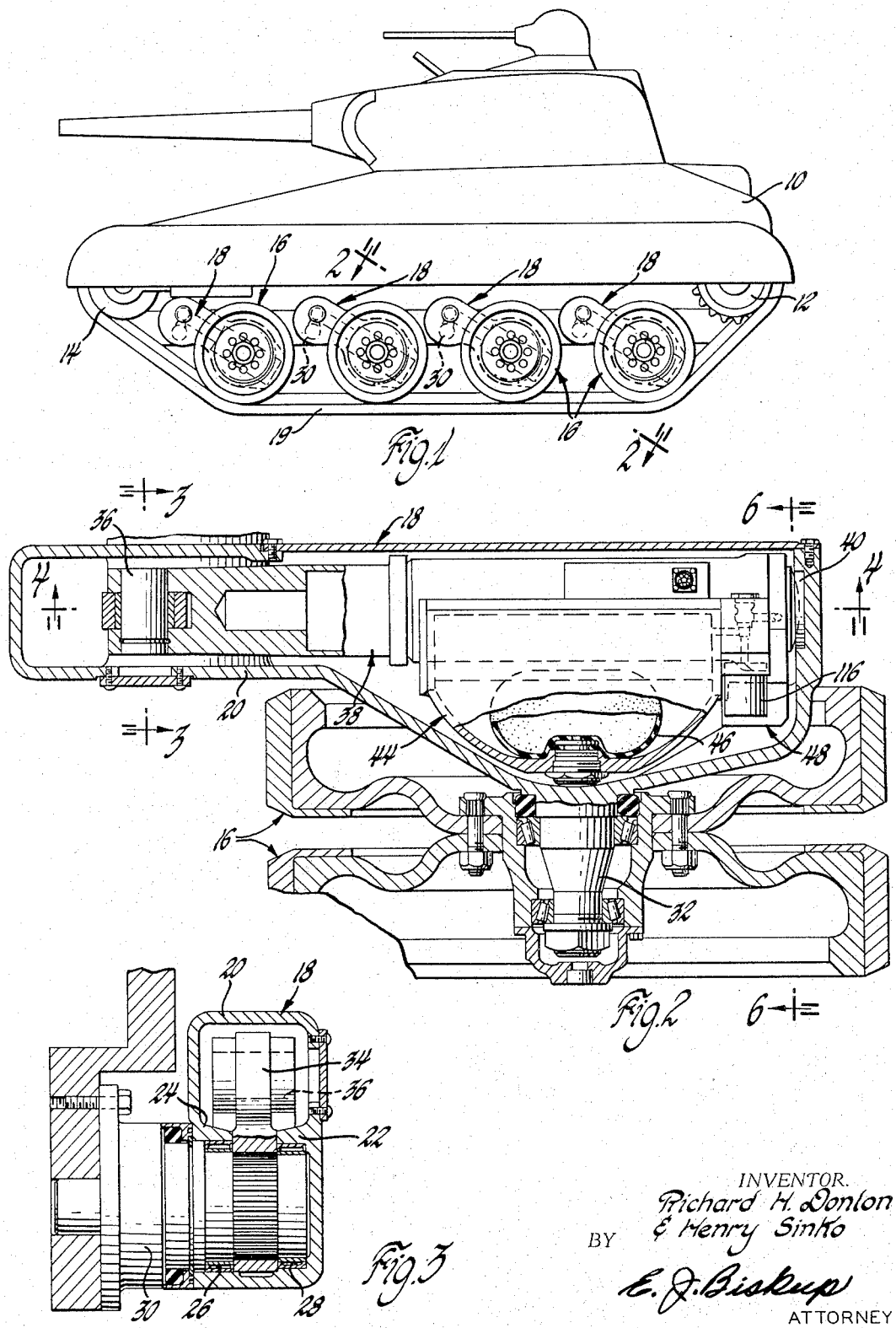
INVENTOR.
Richard H. Donlon
& Henry Sinko
BY
E. J. Biskup
ATTORNEY

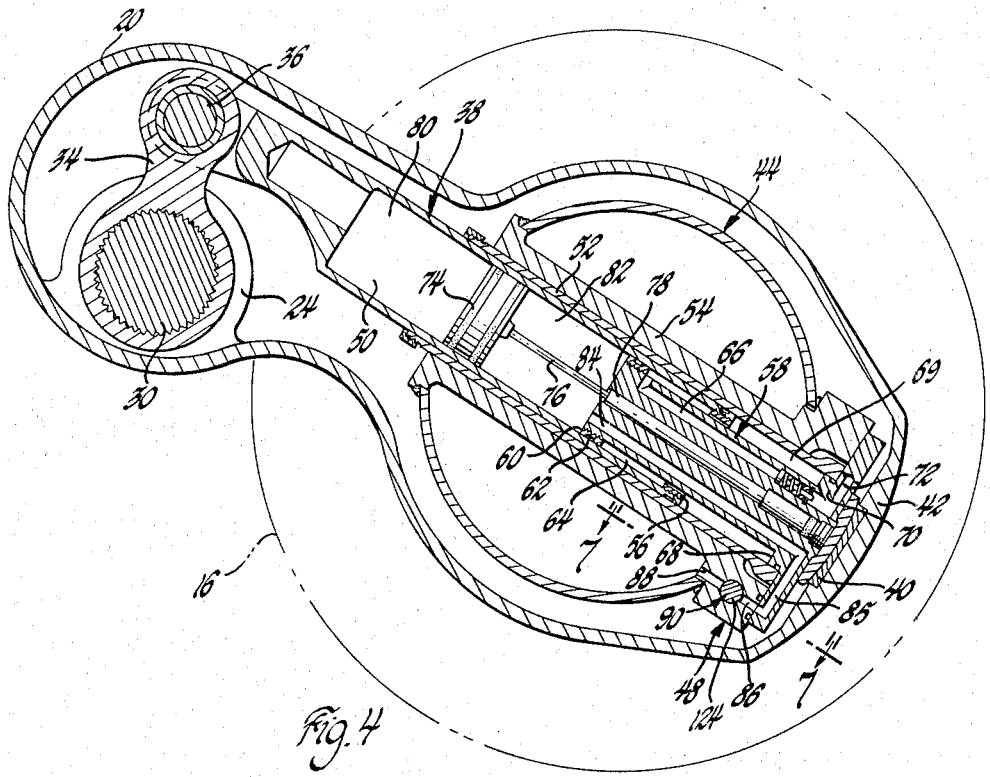

INVENTOR.
Richard H. Donlon
& Henry Sinko
BY
C. J. Biskup
ATTORNEY

United States Patent Office

3,374,005
Patented Mar. 19, 1968

3,374,005
INDEPENDENT WHEEL SUSPENSION
Richard H. Donlon, Haunstetten, Germany, and Henry Sinko, Bay Village, Ohio, assignors to General Motors Corporation, Detroit, Mich., a corporation of Delaware
Filed Aug. 26, 1965, Ser. No. 482,689
5 Claims. (Cl. 280—124)

ABSTRACT OF THE DISCLOSURE

A vehicle suspension unit having a hollow arm pivotally connected adjacent one end to the vehicle and having a road wheel rotatably mounted on the arm adjacent the other end thereof. A spring device is located within the arm for movement therewith and for cushioning oscillatory movement of the arm relative to the vehicle. Means are also provided for pivotally connecting one end of the spring device to a fixed point adjacent the connection between the arm and the vehicle.

---

This invention concerns a vehicle suspension system and more particularly an independently supported suspension arm which has one end thereof pivotally mounted to the vehicle while the other end rotatably supports a road wheel.

One object of the present invention is to provide an improved suspension system for a vehicle.

Another object of the present invention is to provide a selfcontained independent suspension unit having an integrated combination of spring, shock absorber and height adjustment.

A further object of the present invention is to provide an hydropneumatic suspension system for a track laying vehicle in which each wheel station is an independent module so that no hydraulic lines or connections are required to or between wheel stations.

A still further object of the present invention is to provide an independent suspension unit having a road wheel which can be adjusted relative to the vehicle so that the height of the latter can be controlled.

Yet a further object of this invention is to provide an hydropneumatic suspension unit having an accumulator which supplies energy for height control of the unit and in which the accumulator is charged by road wheel motion so that no separate power source is required.

The above objects and others are accomplished in accordance with the invention by providing a suspension unit comprising an elongated hollow arm pivotally supported at one end on the vehicle while the other end of the arm rotatably supports a road wheel. An hydropneumatic spring device is located in the arm for cushioning oscillatory movement of the latter and comprises a primary piston member located in a cylinder member in a manner whereby oscillatory movement of the arm about its pivotal connection with the vehicle results in relative movement between the piston member and the cylinder member. A secondary piston member is also located in the cylinder member and is normally spaced from the primary piston member so as to provide first and second chambers, respectively, filled with a compressible gas and a hydraulic fluid. The arm serves as a sump for hydraulic fluid and, in addition, houses an accumulator that stores pressurized hydraulic fluid which can be directed by means of an appropriate hydraulic circuit to the second chamber so as to cause the secondary picton to move away from the primary piston and thereby cause the road wheel to be lowered relative to the vehicle. A combination shock absorber and pump chamber is provided between the primary piston member and the cylinder member with suitable conduit means and varying connecting this chamber with the accumulator for charging the latter as a result of oscillatory movement of the arm. A sequence valve, which is responsive to a predetermined pressure in the accumulator, is adapted to bypass fluid flow to the latter and direct the pressurized hydraulic fluid from the pump chamber to the sump.

A more complete understanding of the present invention will be obtained from the following detailed description when taken in conjunction with the drawings in which:

FIGURE 1 shows a track laying vehicle incorporating a plurality of suspension units made in accordance with the invention;

FIGURE 2 is an enlarged sectional view taken on line 2—2 of FIGURE 1 and illustrates the construction of one of the suspension units;

FIGURE 3 is a sectional view taken on line 3—3 of FIGURE 2 and shows the pivotal connection between the vehicle and the suspension unit;

FIGURE 4 is a view taken on line 4—4 of FIGURE 2 and illustrates the details of the hydropneumatic suspension cylinder utilized with this invention;

FIGURE 5 is a view similar to FIGURE 4 with the road wheel located in the raised position relative to the vehicle;

Figure 6:
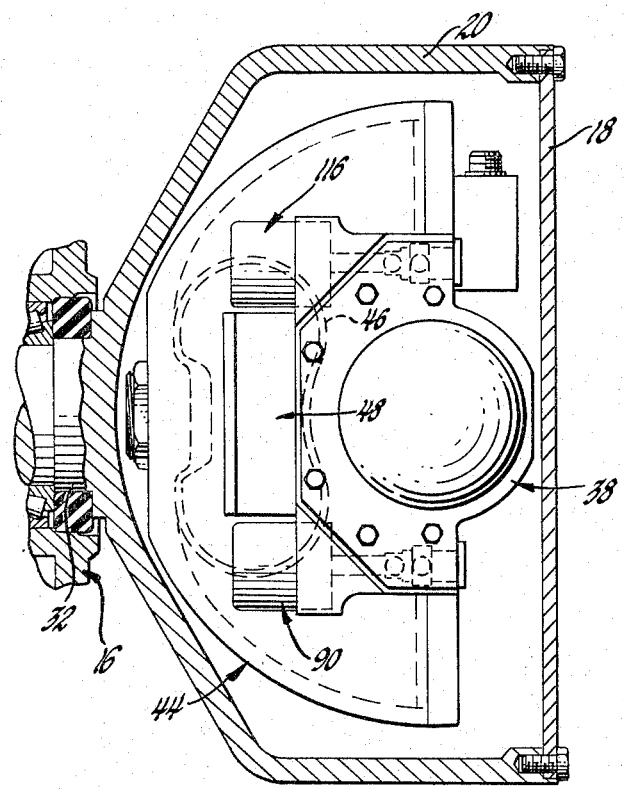
FIGURE 6 is a sectional view taken on line 6—6 of FIGURE 2.

Referring now to the drawings and more specifically to FIGURE 1 thereof, one side of a track laying military vehicle is shown comprising a body 10 having a driving sprocket 12 rotatably supported at the rear end thereof, an idler wheel 14 located in the front portion of the vehicle, and a plurality of road wheels 16 therebetween. Each road wheel 16 is rotatably supported adjacent the free end of a suspension arm 18 which extends forwardly for pivotal connection with the body of the vehicle to permit oscillatory movement of the arm about a transverse axis. An endless track 19 is entrained about the sprocket, idler wheel, and road wheels in the conventional manner so that upon driving the sprocket the track and accordingly the vehicle can be driven forwardly or rearwardly with irregularities in the terrain being compensated for through the oscillatory movement of the suspension arms.

Each of the suspension arms 18 is identical in construction and, as seen in FIGURES 2 through 6, comprises an elongated hollow housing 20 which is formed as a hermetically sealed enclosure. The forward end of the arm 18 has inturned flange portions 22 and 24 integrally formed with the housing 20 and suitably bored so as to provide coaxial cylindrical inner surfaces which are fitted onto spaced needle bearings 26 and 28 supported on a pivot shaft 30 which in turn is rigidly bolted to the hull of the vehicle. Thus, the arm 18 is capable of pivotally moving about the shaft 30 as described above. Adjacent the opposite end of the arm 18 and extending laterally outwardly therefrom is a dead spindle 32 which is integrally formed with the housing 20. This spindle 32 rotatably supports the road wheel 16, the lower end of which engages the inside of the track 19 as seen in FIGURE 1.

As best seen in FIGURES 3 and 4, a yoke 34 has one end thereof rigidly splined to the shaft 30 while the other end is formed as a pivot connection 36 for supporting one end of an hydropneumatic cylinder 38 located within the cavity formed arm 18. The opposite end of the hydropneumatic cylinder 38 is supported through a spherical bearing arrangement 40 on the inner rearward wall 42 of the housing 20. A hemispherically shaped accumulator 44 for storing pressurized hydraulic fluid is mounted on the hydropneumatic cylinder 38 and, as seen in FIGURES 2 and 4, includes a flexible rubber bag 46 filled with a gas such as dry nitrogen. Adjacent to the accumulator 44 and to the rear thereof is a valve block 48 which serves to control flow of hydraulic fluid between the hydropneumatic cylinder 38, the accumulator, and also between a reservoir or sump which the housing 20 serves as. Appropriate valving and passages are formed in the valve block 48 for controlling the operation of the hydropneumatic cylinder in a manner which will become more apparent as the description of the invention proceeds.

The hydropneumatic cylinder 38 serves as a spring device for cushioning oscillatory movement of the road wheel 16 as the vehicle traverses irrregular terrain. More specifically, it will be noted that the hydropneumatic cylinder 38 comprises a cylinder member 50 that is slidably supported within a tubular casing 52 which is rigidly attached to an outer sleeve 54, the rearward end of which is formed with the valve block 48 mentioned above. The inner end of the cylinder portion 50 terminates with an annular ring 56 which circumferentially engages the outer diameter or rod portion of a primary piston member 58. The inner end of the piston member 58 has a head portion formed with an annular ring 60 which, in this case, has a wiping ring 62 mounted thereon for sealingly engaging the inner surface of the cylinder member 50. Thus, an annular chamber 64 is provided between the rings 56 and 60 located at respective ends of the cylinder and piston members. This chamber 64 constitutes the rebound portion of a shock absorber which forms a part of the hydropneumatic cylinder. The chamber 64 also serves as a pump chamber which connects through a passage 66 formed in the piston member 58 to the valve block 48 which includes suitable passages that lead to the accumulator 44 and to the sump as will be described hereinafter. The opposite side of the ring 56 together with an annular shoulder 68 integrally formed with the piston member 58 forms a jounce chamber 69 of the shock absorber alluded to above. Passages 70 and 72 and others formed in the valve block 48 permit fluid to flow between the reservoir and the jounce chamber.

A secondary piston member 74 is slidably located within the cylinder member 50 and centrally supports a rod 76 which extends into and is slidably supported by a tube 78 centrally fitted within the primary piston member 58. The rod 76 and tube 78 constitute a linear potentiometer of the type commercially available and in which the tube houses a resistive track while the inner end of the rod supports a brush block having a precious metal wiper engaging the track. Thus, relative movement between the rod and tube develops a variable output signal which can be picked up by appropriate instrumentation for determining the position of the piston 74 relative to the piston 58. This position determines the static wheel position and vehicle ground clearance for a given wheel load.

The secondary piston member 74 divides the cylinder member into chambers 80 and 82 which respectively are filled with a compressible gas such as dry nitrogen and a hydraulic fluid. The chamber 82 connects to the accumulator 44 through passages 84, 85, 86, and 88, the latter of which is normally closed by a solenoid operated valve 90. The chamber 80 serves as a gas spring chamber so that during jounce the gas is compressed and absorbs the shock loads transmitted to the road wheel. It will be noted that the piston 74 normally does not move during gas compression and expansion due to the column of fluid located in the chamber 82.

Hydraulic fluid can be added or removed from the chamber 82 to adjust the static length of the cylinder 38 and accordingly the position of the road wheel relative to the vehicle. For example, when the suspension unit is in the position of FIGURE 4 and chamber 82 is connected to the reservoir, the vehicle load causes the primary piston 58 to force oil out of the chamber 82 and into the reservoir resulting in a shortening of the cylinder 38 and lowering of the vehicle as the arm 18 pivots counterclockwise about the shaft 30. On the other hand, when the chamber 82 is connected with the accumulator 44, fluid is added to the former causing the primary piston 74 to move away from the secondary piston 58 which results in a lengthening of the cylinder 38 with subsequent lowering of the road wheel relative to the vehicle so that the latter is raised relative to the ground.

The hydraulic control circuit for the hydropneumatic cylinder described above can be seen in FIGURE 8. It will be noted that the shock absorber rebound chamber 64 is connected through passage 66 and line 92 to the accumulator 44. A check valve 94 is located in the line 92 and permits fluid to flow in the direction of the arrow. A line 96 also connects the rebound and pump chamber 64 with a sequence valve 98 which is connected by a line 100 and a check valve 102 to the reservoir. The sequence valve 98 is connected through a pilot line 104 to the accumulator pressure in the line 92. It will be understood that the sequence valve is of the well-known commercially available type which permits the fluid to be normally blocked between lines 96 and 100, however, once the accumulator is fully charged at a predetermined pressure, this fact is telegraphed to the sequence valve 98 via the pilot line 104 so as to permit the pressurized fluid emanating in the chamber 64 to flow via lines 96, 100, and shock valve 102 to the reservoir. The sequence valve is used in cases where it is determined that an accumulator pressure level higher than the shock valve 102 blow-off pressure is required.

The shock absorber jounce chamber 69 is connected through lines 106, 108, and 110 to the reservoir. Lines 106 and 108 are respectively provided with a shock valve 112 and a check valve 114 having fluid flow in the direction of the arrows. Thus, it should be apparent that upon compression of the hydropneumatic cylinder, fluid passes through shock valve 112 to the reservoir with some of the fluid flowing via a check valve 115 to the chamber 64. During expansion, however, hydraulic fluid is sucked from the reservoir through lines 110, 108, check valve 114 and line 106 back to the shock chamber 69 while at the same time fluid in chamber 64 flows to the accumulator 44 or reservoir as explained above.

Figure 7:
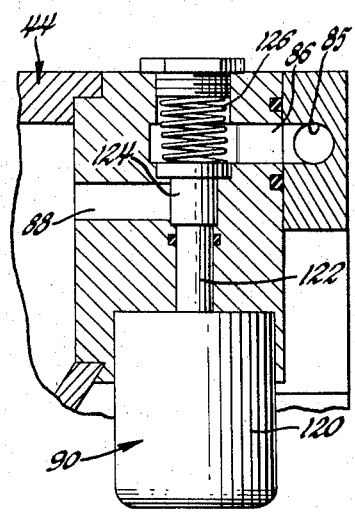
FIGURE 7 is a view taken on line 7—7 of FIGURE 4 and illustrates the construction of one of the solenoid valves utilized in the hydraulic circuit associated with the hydropneumatic cylinder.

Solenoid operated valves 90 and 116 are provided for controlling the flow of fluid to and from the height adjustment chamber 82. Each of the valves 90 and 116 are constructed, as shown in FIGURE 7, and include a coil housing 120 from which extends a reciprocally supported armature 122 which is connected to a valve 124. As seen in FIGURES 4 and 7, communication between the passages 85, 86 and 88, provided on opposite sides of the valve 122, is blocked. When the coil in housing 120 is energized, the valve 124 is moved against the force of the spring 126 to provide communication between the passages 86 and 88 and thereby supply pressurized fluid from the accumulator 44 to the chamber 82 and thereby raise the vehicle as explained above. For purposes of exhausting fluid from the height adjustment chamber 82 so as to lower the vehicle, solenoid operated valve 116 is energized, permitting fluid to flow through the passage 84, lines 85 and 128, the solenoid valve 116 and line 130 to the reservoir.

Figure 8:
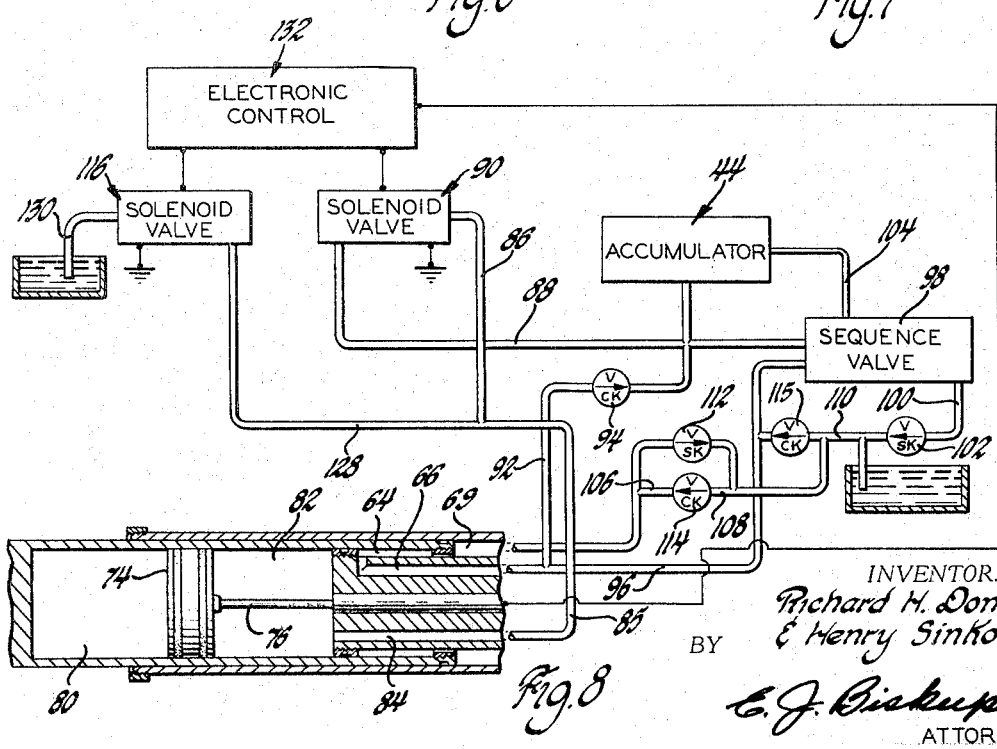
FIGURE 8 is a schematic diagram showing the hydraulic circuit which serves to control flow of fluid between the hydropneumatic cylinder, the accumulator, and the reservoir.

Thus, from the above description it should be apparent that normal oscillatory movement of the suspension arm 18 causes a pumping action which permits the accumulator 44 to be charged. Hence, an external power source is not required to charge the accumulator and the entire unit can be self-contained for mounting on a vehicle. Moreover, by having a free piston 74 in the hydropneumatic cylinder 38, variable height control can be obtained in a simple manner. As seen in FIGURE 1, each wheel station operates independently of all other wheel stations and, accordingly, a central electronic control 132, as seen in FIGURE 8, can be used for height selection commands to all wheel units. The electronic control 132 will operate the solenoid valves for raising and lowering the vehicle. An electrical signal voltage representing the requested length of the hydraulic column in chamber 82 will be received from a central control potentiometer located at the driver's station in the vehicle. This signal can be compared with a potentiometer feedback signal which is proportional to the existing length of the hydraulic column in the cylinder. The error signal can then be amplified and used to drive a trigger circuit which energizes the appropriate solenoid valve to raise or lower the vehicle.

It will be understood, that as used herein, a shock valve is one in which the valve is biased into a closed position by spring means so that a predetermined pressure is required to open the valve.

While but one embodiment of the invention has been shown and described, it should be apparent that changes and modifications may be made therein without departing from the spirit of the invention. It is, therefore, to be understood that it is not intended that the invention be limited to the embodiment shown, but only by the scope of the claims which follow.

What is claimed is:

1. A suspension unit for a vehicle, comprising an arm having a closed cavity formed therein, a shaft supporting one end of said arm on said vehicle for oscillatory movement about a first axis extending transversely of said vehicle, a road wheel, means connecting the road wheel to said arm about a second transverse axis located adjacent the other end of said arm, an hydropneumatic spring device located in said cavity for cushioning said oscillatory movement, said spring device comprising a primary piston member located in a cylinder member, a yoke rigidly connected to said shaft, means connecting one of said members to said yoke for pivotal movement about a third transverse axis spaced from said first transverse axis, means connecting the other of said members to said other end of the arm so that oscillatory movement of the arm causes relative movement of the members, a secondary piston member located in said cylinder member and normally spaced from the primary piston member so as to provide first and second chambers on opposite sides of the secondary piston member, a compressible gas located in the first chamber, a hydraulic fluid located in the second chamber, a reservoir in the arm, an accumulator located in said reservoir for supplying pressurized hydraulic fluid to the second chamber, a pump chamber provided between the primary piston member and the cylinder member, conduit means connecting the pump chamber with the accumulator for charging the latter during oscillatory movement of said arm, and a sequence valve responsive to a predetermined pressure in the accumulator for bypassing the latter and directing pressurized hydraulic fluid from said pump chamber to said reservoir.

2. A suspension unit for a vehicle, comprising an elongated hollow arm, a shaft supporting one end of said arm on said vehicle for oscillatory movement about a first axis extending transversely of said vehicle, a road wheel, means connecting the road wheel to said arm about a second transverse axis located adjacent the other end of said arm, a hydropneumatic spring device located in said cavity for cushioning said oscillatory movement, said spring device comprising a primary piston member located in a cylinder member, a yoke rigidly connected to said shaft, means connecting one of said members to said yoke for pivotal movement about a third transverse axis spaced from said first transverse axis, means connecting the other of said members to said other end of the arm so that oscillatory movement of the arm causes relative movement of the members, a secondary piston member located in said cylinder member and normally spaced from the primary piston member so as to provide first and second chambers, a compressible gas located in the first chamber, a hydraulic fluid located in the second chamber, a reservoir in the arm, an accumulator located in said arm and containing pressurized hydraulic fluid, normally closed valve means located between the accumulator and the second chamber, means to cause the valve means to open whereby pressurized hydraulic fluid is directed to the second chamber from the accumulator so as to cause the secondary piston to move away from the primary piston and cause the road wheel to be lowered relative to the shaft, a pump chamber provided between the primary piston member and the cylinder member, conduit means connecting the pump chamber with the accumulator for charging the latter during oscillatory movement of said arm, and a sequence valve responsive to a predetermined pressure in the accumulator for bypassing the latter and directing pressurized hydraulic fluid from said pump chamber to said reservoir.

3. A suspension unit for a vehicle, comprising an elongated hollow arm, a shaft supporting one end of said arm on said vehicle for oscillatory movement about a first axis extending transversely of said vehicle, a road wheel, means connecting the road wheel to said arm about a second transverse axis located adjacent the other end of said arm, a hydropneumatic spring device located in said arm for cushioning said oscillatory movement, said spring device comprising a primary piston member located in a cylinder member, a yoke rigidly connected to said shaft, means connecting one of said members to said yoke for pivotal movement about a third transverse axis spaced from said first transverse axis, means connecting the other of said members to said other end of the arm so that oscillatory movement of the arm causes relative movement of the members, a secondary piston member located in said cylinder member and normally spaced from the primary piston member so as to provide first and second chambers, a compressible gas located in the first chamber, a hydraulic fluid located in the second chamber, a reservoir located in the arm for storing hydraulic fluid, an accumulator located in said reservoir for storing pressurized hydraulic fluid, passage means connecting the reservoir and the accumulator with the second chamber, valve means located in said passage means for selectively connecting the reservoir with the second chamber and the latter with the accumulator so that fluid is exhausted from the second chamber to raise the arm relative to the vehicle and so that fluid is directed to the second chamber to lower the arm relative to the vehicle respectively, means connected between the primary and secondary piston members for determining the distance between said piston members, a pump chamber provided between the primary piston and the cylinder, conduit means connecting the pump chamber with the accumulator for charging the latter during oscillatory movement of said arm, and a sequence valve responsive to a predetermined pressure in the accumulator for bypassing the latter and directing pressurized hydraulic fluid from said pump chamber to said reservoir.

4. A suspension unit for a track laying vehicle, comprising an elongated arm having a closed cavity formed therein, a shaft supporting one end of said arm on said vehicle for oscillatory movement about a first axis extending transversely of said vehicle, a road wheel, means connecting the road wheel to said arm about a second transverse axis located adjacent the other end of said arm, a hydropneumatic spring device located in said cavity for cushioning said oscillatory movement, said spring device comprising a primary piston member located in a cylinder member, a yoke rigidly connected to said shaft and extending upwardly therefrom, means connecting one of said members to said yoke for pivotal movement about a third transverse axis vertically spaced from said first transverse axis, means connecting the other of said members to said other end of the arm so that oscillatory movement of the arm causes relative movement of the members, a secondary piston member located in said cylinder member and normally spaced from the primary piston member so as to provide first and second chambers, a compressible gas located in the first chamber, a hydraulic fluid located in the second chamber, a reservoir located in the cavity for storing hydraulic fluid, passage means in said primary piston for connecting the reservoir with the second chamber, an accumulator located in said reservoir and containing pressurized hydraulic fluid, first valve means located between said reservoir and said passage means for normally blocking communication therebetween, second valve means located between the accumulator and the passage means for normally blocking communication therebetween, means to cause the first valve means to open whereby hydraulic fluid is exhausted from the second chamber to the reservoir so that the secondary piston moves toward the primary piston with resultant raising of the road wheel relative to the shaft, means to cause the second valve means to open whereby pressurized hydraulic fluid is directed to the second chamber from the accumulator so as to cause the secondary piston member to move away from the primary piston member and cause the road wheel to be lowered relative to the shaft, a pump chamber provided between the primary piston member and the cylinder member, conduit means connecting the pump chamber with the accumulator for charging the latter during oscillatory movement of said arm, and a sequence valve responsive to a predetermined pressure in the accumulator for bypassing the latter and directing pressurized hydraulic fluid from said pump chamber to said reservoir.

5. A suspension unit for a track laying vehicle, comprising an elongated arm having a closed cavity formed therein, a shaft supporting one end of said arm on said vehicle for oscillatory movement about a first axis extending transversely of said vehicle, a road wheel, means connecting the road wheel to said arm about a second transverse axis located adjacent the other end of said arm, a hydropneumatic spring device located in said cavity for cushioning said oscillatory movement, said spring device comprising a primary piston member loacted in a cylinder member, a yoke rigidly connected to said shaft, means connecting one of said members to said yoke for pivotal movement about a third transverse axis vertically spaced from said first transverse axis, means connecting the other of said members to said other end of the arm so that oscillatory movement of the arm causes relative movement of the members, a secondary piston member located in said cylinder member and normally spaced from the primary piston member so as to provide first and second chambers, a compressible gas located in the first chamber, a hydraulic fluid located in the second chamber, a reservoir located in the cavity for storing hydraulic fluid, passage means in said primary piston for connecting the reservoir with the second chamber, an accumulator located in said reservoir and containing pressurized hydraulic fluid, first valve means located between said reservoir and said passage means for normally blocking communication therebetween, second valve means located between the accumulator and the passage means for normally blocking communication therebetween, solenoid means to cause the first valve means to open whereby hydraulic fluid is exhausted from the second chamber to the reservoir so that the secondary piston moves toward the primary piston with resultant raising of the road wheel relative to the shaft, solenoid means to cause the second valve means to open whereby pressurized hydraulic fluid is directed to the second chamber from the accumulator so as to cause the secondary piston member to move away from the primary piston member and cause the road wheel to be lowered relative to the shaft, a linear potentiometer connected between the primary and secondary piston members for determining the distance between said piston members, a pump chamber provided between the primary piston and the cylinder, conduit means connecting the pump chamber with the accumulator for charging the latter during oscillatory movement of said arm, and a sequence valve responsive to a predetermined pressure in the accumulator for bypassing the latter and directing pressurized hydraulic fluid from said pump chamber to said reservoir.

References Cited

UNITED STATES PATENTS

| 3,085,817 | 4/1963 | Krause | 280—124.3 |
| 2,973,195 | 2/1961 | Armstrong | 267—15 |
| 2,942,873 | 6/1960 | Wordsworth | 267—15 |
| 3,013,843 | 12/1961 | Sinko | 305—10 |

FOREIGN PATENTS

| 1,261,121 | France. |

BENJAMIN HERSH, *Primary Examiner.*

PHILIP GOODMAN, *Examiner.*